United States Patent [19]

Hobbs

[11] 4,070,530
[45] Jan. 24, 1978

[54] CATALYTIC AMINATION OF POLYMERIC POLYOLS AND RESULTING AMINO SUBSTITUTED POLYMERS

[75] Inventor: Charles F. Hobbs, Des Peres, Mo.
[73] Assignee: Monsanto Company, St. Louis, Mo.
[21] Appl. No.: 627,438
[22] Filed: Oct. 30, 1975
[51] Int. Cl.² .......................... C08F 8/30; C08F 8/32; C08F 16/06; C08F 16/08
[52] U.S. Cl. .................................. 526/7; 260/29.6 B; 260/29.6 HN; 260/836; 428/511; 526/8; 526/9; 526/13; 526/16; 526/19; 526/48.1; 526/310
[58] Field of Search ..................... 526/25, 47, 7, 8, 9, 526/13, 16, 19, 48, 310

[56] References Cited

U.S. PATENT DOCUMENTS

| | | | |
|---|---|---|---|
| 2,628,221 | 2/1953 | Marsh | 260/85.7 |
| 2,632,757 | 3/1952 | Reynolds et al. | 260/79.3 |
| 2,648,717 | 8/1953 | Ross et al. | 526/9 |
| 2,972,606 | 2/1961 | Haptman et al. | 526/9 |
| 3,117,951 | 1/1964 | Itoi | 526/9 |
| 3,410,811 | 11/1968 | Bufton | 260/2.1 |

FOREIGN PATENT DOCUMENTS

| | | | |
|---|---|---|---|
| 629,380 | 10/1961 | Canada | 526/9 UX |
| 1,575,557 | 7/1969 | France | 526/9 UX |
| 1,037,851 | 8/1958 | Germany | 526/9 UX |
| 844,448 | 8/1960 | United Kingdom | 526/9 UX |

OTHER PUBLICATIONS

C.A. 66, 28323U.
Comptes Pendus 246, 1425 (1958).
"Methods in Carbohydrate Chemistry," R. L. Whistler et al., (1963).

*Primary Examiner*—Stanford M. Levin
*Attorney, Agent, or Firm*—Thomas B. Leslie

[57] ABSTRACT

Amino substituted polymeric polyols are produced through Group VIII metal catalytic amination of polymers comprising ethylenically unsaturated alcohols and copolymers of said alcohols and vinyl compounds. Polyamines produced by the amination of polyols and/or copolymers thereof having pendant amino and hydroxyl groups or polyamines having said groups fixed to pendant methylene groups are represented by the general formula:

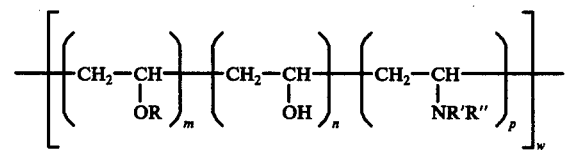

where
R is hydrogen or an acyl group;
R', R" are hydrogen or an alkyl group
n is an integer and
m, p and w are integers of 1 or more; and

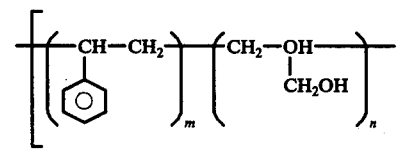

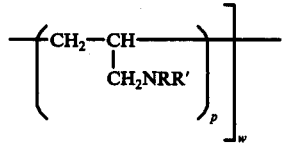

where
R and R' are hydrogen or an alkyl group,
m is an integer
n, p, and i w are integers of one or more.

9 Claims, No Drawings

CATALYTIC AMINATION OF POLYMERIC POLYOLS AND RESULTING AMINO SUBSTITUTED POLYMERS

BACKGROUND OF THE INVENTION

This invention relates to novel polymeric polyamines and methods for their preparation, and more particularly the production of amino substituted polymeric polyols produced through the catalytic amination of polymers comprised of ethylenically unsaturated alcohols and copolymers of said alcohols and vinyl compounds. In another aspect the present invention provides novel polymeric polyamines having pendant amino groups or pendant aminomethyl groups through a one step Group VIII metal catalyzed amination process.

Known routes to the preparation of polymeric polyamines utilize multi-step process technology or involve relatively expensive starting materials such as ethyleneimine. These known processes normally provide polyamines having nitrogen incorporated into the backbone of the polymer as a secondary amine. Polymerization of unsaturated amines is in general an unsatisfactory and unsuccessful approach for producing polyamines resulting only in low molecular weight oligomers. Aminolysis of polyhydroxy, alcohol-containing materials has been described in the art. Such processes describe the degradative aminolysis of saccharides and starches to give predominantly low molecular weight nitrogen compounds, such as ethylene diamine, piperazines, and the like. It is also recognized that the substitution of hydroxyl functionality contained in commercial polymeric polyols by amine would be rather difficult to effect.

According to the invention, certain polyol polymers and copolymers thereof can be contacted with ammonia or amines under suitable reaction conditions such as Group VIII metal catalyzation, to give long chain polymeric polyamines. I have discovered that the amination of polymers of ethylenically unsaturated alcohols and copolymers of said alcohols and vinyl compounds is possible through the use of hydrogenation type catalysts, i.e. Group VIII metal catalysts.

STATEMENT OF THE INVENTION

In view of the disadvantages of the methods disclosed by known processes of producing polyamines, a principal object of this invention is to provide a catalyzed amination process wherein amino groups are substituted for hydroxy groups found in polymeric polyols and copolymers thereof.

A further object of the invention is the preparation of novel polymeric polyamines having pendant amino and hydroxy groups or polyamines having said groups affixed to pendant methylene groups. These and other objects will become apparent from the descriptions and the claims which follow.

I have found that polymers containing pendant amino groups and hydroxy groups can be prepared in one reaction step from polymers of allyl alcohols and vinyl compounds by contacting said polymers with ammonia, or primary and/or secondary alkyl amines in the presence of a suitable catalyst. Suitable catalysts are those generally used in the hydrogenation of organic compounds, that is, Group VIII metal catalysts.

Specifically the process of my invention produces polymers having pendant amino and hydroxyl groups through the amination of polymers comprised of ethylenically unsaturated alcohols, copolymers of said alcohols and vinyl compounds selected from the group consisting of vinyl esters and styrene wherein said polymers are produced by contacting the copolymers with at least one of ammonia, mono- and/or polyaliphatic amines in the presence of at least one of a hydrogenation, Group VIII metal catalysts. Amino-substituted polymeric polyols produced by the inventive process may be represented by the general formula:

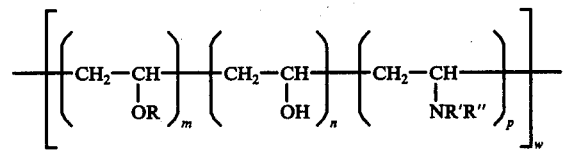

where
R is hydrogen or an acyl group having from 1 to about 20 carbon atoms per group;
R' or R" are hydrogen or an alkyl group having from 1 to about 20 carbon atoms per group;
n is an integer, and
m, p, and w are integers of one or more; and

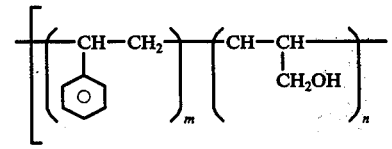

where
R or R' is hydrogen or an alkyl group having from 1 to about 20 carbon atoms per group,
m, n, p and w are integers of one or more.

Temperatures for the catalyzed amination according to the invention range from about 150° C to about 300° C and higher. Suitable solvents may be employed but are not found to be necessary, however the use of water as a solvent improves the incorporation of ammonia into the polymer. Reaction pressures employed generally range from about 500 to about 2500 psig. The polymeric polyol starting materials may be partially esterified as in, for example, partially hydrolyzed polyvinyl acetate. The molecular weight of the starting polyols is not critical and materials ranging from a molecular weight of about 2000 to a molecular weight of about 115,000 or more can be successfully utilized according to the invention. The resulting polymeric products have a total nitrogen content of from trace amounts up to about 5% to 7% by weight of the polymer and up to about 4% by weight may be basic nitrogen. The polyamine products according to the invention have potential use as crosslinking agents and coatings suitable for either the paper or textiles applications. They also find utility as size setting agents, emulsifying agents, and water treatment agents. Other uses include dye improvement additives for polyesters, intermediates for cationic polymers e.g. electrostatic coatings, and hardener for epoxy resins.

DESCRIPTION OF THE PREFERRED EMBODIMENTS

Polyvinyl alcohols of nominal molecular weight from about 5000 to about 115,000 are suitable feedstock materials according to the invention wherein said alcohols are heated with ammonia, primary and/or secondary alkyl amines. Said alkyl groups having from 1 to about 10 or more carbon atoms per group.

The amination process utilizes a number of hydrogenation type catalysts, for example, nickel on alumina, nickel on kieselguhr, nickel on silica, Raney nickel, ruthenium on alumina, ruthenium on carbon, rhodium on alumina, palladium on alumina, palladium on charcoal, chromium on alumina, cobalt on various supports, copper chromates, and the like. The nickel catalysts appear to be the most effective with nickel on kieselguhr exhibiting the greatest activity resulting in an amination product having a basic nitrogen content approaching 4 weight percent. Preferred temperature ranges appear to be from about 150° to about 175° C for nickel on kieselguhr vs. about 200° C for Raney nickel. At about 150° C, nickel on kieselguhr gave about the same degree of amination as did Raney nickel at 200° with less degradation.

Degradation of product polymers was noted under the more severe reaction conditions which were evidenced by low material recovery and loss of molecular weight. The estimated sequence for amination of secondary alcohols is dehydrogenation of the alcohol to the ketone followed by reductive amination of the ketone.

Amination of polyvinyl alcohols occurred in the absence of solvents other than anhydrous ammonia, however improved results were obtained with water solvents. The beneficial effect of water is suspected to be due to mixing efficiency and higher concentrations of ammonia in the condensed phase. Other solvents such as ethylene glycol and dimethyl ether were suitable, but not necessary according to the invention. Aminated polyvinyl alcohols produced according to the invention are white to off-white water soluble polymers containing up to about 4% basic amine nitrogen. These polymers can be used as crosslinking agents for paper coatings and intermediates for water treatment agents. Limited observation suggests that the aminated inventive products are superior to polyvinyl alcohol as an emulsifying agent.

The amination of styrene/allyl alcohol copolymer was effected according to the invention using several Group VIII catalysts. Basic amine nitrogen content of about 2% could be obtained readily with Raney nickel; however supported nickel catalyst such as nickel kieselguhr demonstrate a good activity for the reaction. Since the starting polymer contained about 7% hydroxyl groups, 2% amine nitrogen represents substitution of about 30% of the hydroxyl groups by the amine. Most reactions were carried out using only excess ammonia as solvent. In contrast to the inventive products resulting from amination of polyvinyl alcohols, those products resulting from styrene/allyl alcohol copolymers contained predominantly primary amine groups, especially in the case of supported nickel catalyst. For example, products produced with Raney nickel contained 25 to 50% of the basic nitrogen in secondary and tertiary amine groups, whereas the products resulting from supported nickel contained no detectable (less than 0.25%) secondary or tertiary amine groups. Monomethyl and dimethyl amines were also used as aminating agents and gave products containing about 2% basic amine production. The styrene/allyl alcohol copolymer was notably more stable to decomposition and cleavage under amination conditions than were the polyvinyl alcohols. Evidence of this relationship was found in the fact that material recoveries were generally better (greater than 87%) and color formation was noticeably absent though reactions were usually carried out at 250° C, some 50° C higher than the reaction conditions with the polyvinyl alcohols. As in the case of polyvinyl alcohols, amination of styrene/allyl alcohols introduced non-basic nitrogen in addition to amine nitrogen to the polymer product.

The following formulation schematics are presented as representative of the polyvinyl alcohol, partially hydrolyzed polyvinyl acetate, and styrene/allyl alcohol amination processes.

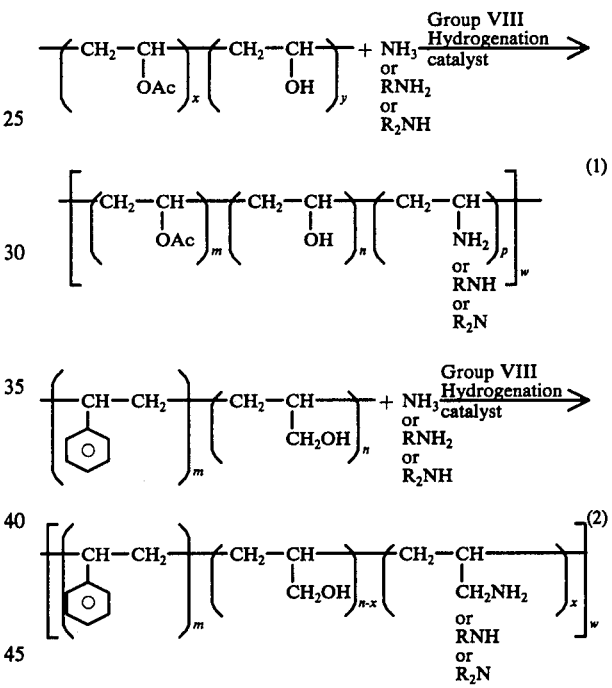

The reaction of the invention replaces the OH group with $NH_2$, $NR_2$, or RNH groups. Side reaction according to reaction 1 occurs when a portion of the acetate groups are converted to hydroxyl groups thus resulting in a product wherein $m$ and $n$ are not direct functions of $y$. In most of the following examples, according to reaction 1, $x$ is approximately zero and $y$ approaches 100% by weight. The process according to my invention produces a polymer wherein the integrity of the reaction molecule is maintained. This is not the case however where sugars and carbohydrates are aminated resulting in cleavage and producing products such as ethylene diamine and the like.

In the reaction scheme 2, the copolymers of styrene/allyl alcohols produce a reaction product wherein $m$ is approximately 3 and $n$ is approximately 2, however this is not a limitation as the true relationship is represented by $n - x$. In either case, 1 or 2 above, it is preferred that the OH be on non-adjacent carbons or in the case of the acetate that the OH and the OAc group be on non-adjacent carbons as well. Because, as in the case of carbohydrates where the OH groups are closer than on non-adjacent carbons, cleavage occurs, defeating the increase in molecular weight as desired and produced according to the invention.

In order that those skilled in the art may more readily understand the present invention and certain preferred methods by which it may be carried into effect, the following illustrative examples and general amination procedures are afforded.

A general procedure was followed wherein a forty-five milliliter stainless steel Parr bomb equipped with pressure gauge and valve block was charged under nitrogen atmosphere with the polyol, catalyst and solvent when utilized. In general, water was used for the polyvinyl alcohols, whereas the styrene/allyl alcohol copolymer was aminated without solvent other than the amine or ammonia. The bomb was sealed and anhydrous ammonia condensed from a calibrated reservoir by cooling the bomb in a solid $CO_2$ bath. Hydrogen gas was then pressured into the bomb as desired. The bomb was placed in a cylindrical heating mantle in a power shaker and heated to the desired temperature. Using the quantities of reactants specified in the following examples, autogenous pressures were utilized in the range of about 750 to 1000 psig for the polyvinyl alcohol and about 1000 to about 1500 psig for the styrene/allyl alcohol copolymer aminations. At the completion of the aminations, the bomb was cooled and the excess ammonia vented.

The polyvinyl alcohols reactive products, usually a viscous syrup or gum, were taken up in hot water, filtered to recover catalyst and the solution freeze dried to remove solid product. In large scale preparative examples, the filtered aqueous solutions were concentrated under vacuum to about 10% solids content until the distillant was no longer basic. The styrene/allyl alcohol copolymer reaction products formed solid, foamed product after venting ammonia and were taken up in tetrahydrofuran, filtered to remove catalyst, and the solvent removed under vacuum to obtain a foamed solid which was easily crushed to a granular powder. Total nitrogen content was determined by standard combustion techniques. Basic, or amine, nitrogen was determined by perchloric acid titration in acetic acid.

EXAMPLE 1

A 45 ml. stainless steel bomb, fitted with gauge and valve block was charged with 3g. of polyvinyl alcohol (molecular weight, avg., 14,000) and 0.5g of W-4 Raney nickel (R. L. Augustine, "Catalytic Hydrogenation," Marcel Dekker, N.Y., 1965).

The bomb was closed and 2.6g of anhydrous ammonia condensed in through the valve block from a calibrated reservoir. The bomb and contents were then heated to 200° C for 5.5 hr. with shaking. The maximum pressure reached 900 psig. The bomb was cooled, vented, and the contents were taken up in hot water and filtered to remove catalyst. A portion of the aqueous filtrate was freeze dried to obtain solid product. Analysis of the product showed C, 55.6%; H, 1.4%, N, 2.8%. Basic nitrogen content by perchloric acid titration was 1.4%.

EXAMPLE 2

A 45 ml. stainless steel bomb, fitted with gauge and valve block was charged with 3g. of polyvinyl alcohol (avg. molecular weight, 14,000), 4g. of water and 0.5g of No. 28 Raney nickel catalyst (Raney Catalyst Division, W. R. Grace and Co.).

The bomb was closed and 3.5g of anhydrous ammonia was condensed in through the valve block from a calibrated reservoir. The bomb and contents were heated to 200° C for 5.5 hr. with shaking. The bomb was cooled, vented, and the syrupy contents diluted with an equal volume of water and then filtered to remove catalyst. A portion of the filtrate was freeze dried to afford solid product. Analysis of the solid indicated C, 51.3%; H, 8.1%; N, 5.3%; basic amine nitrogen, 2.7%.

EXAMPLES 3 & 4

The reaction was repeated as in Example 2, using 3g. of the polyvinyl alcohol, 3.5g. of ammonia, 4g. of water, and 0.5g. of No. 28 Raney nickel catalyst. Reaction time was 5.5 hr. and temperature was 200° C. The polyvinyl alcohol, was varied as shown in the following table.

| Example No. | PVA Avg. Molecular wt. | Nitrogen Content Total | Nitrogen Content Basic |
|---|---|---|---|
| 3 | 86,000 | 2.0 | 2.0 |
| 4 | 115,000 | 2.5 | 2.0 |

EXAMPLE 5

A 500 ml. stainless steel bomb was charged with 60g. of polyvinyl alcohol (avg. molecular weight, 115,000), 80g. of water, and 10g. of No. 28 Raney nickel catalyst. A total of 140g. of anhydrous ammonia was condensed in and the reaction was carried out at 200° C for 5.5 hr. The product was worked up and analyzed as in Example 2, and contained 2.4% total nitrogen, 1.7% basic nitrogen.

EXAMPLES 6-17

The reaction was carried out exactly as described in Example 2 except that the catalyst, polyvinyl alcohol, and reaction conditions were varied as shown in the following table, and 100 psig of hydrogen was added. The nitrogen content of the product is shown in the table.

TABLE I

| Example No. | PVA, Avg. Molecular wt. | Catalyst | Temp. °C | Time, hr | Nitrogen Content Total | Nitrogen Content Basic |
|---|---|---|---|---|---|---|
| 6 | 14,000 | Ni-1404[a] | 200 | 5.5 | 5.6 | 2.5 |
| 7 | 14,000 | Ni-0107[b] | 200 | 5.5 | 3.6 | 2.4 |
| 8 | 14,000 | Ni-0104[c] | 200 | 5.5 | — | 3.0 |
| 9 | 14,000 | Ni-0104[d] | 200 | 5.5 | — | 3.4 |
| 10 | 14,000 | Ni-0104 | 190 | 5.5 | 7.8 | 3.7 |
| 11 | 14,000 | Ni-0104 | 175 | 5.5 | 3.8 | 3.4 |
| 12 | 14,000 | Ni-0104 | 150 | 5.5 | 1.5 | 2.0 |
| 13 | 14,000 | Ni-0104 | 125 | 5.5 | 2.2 | 1.0 |
| 14 | 14,000 | Ni-0104 | 140 | 21.0 | 3.1 | 3.4 |
| 15 | 115,000 | Ni-0104 | 200 | 5.5 | — | 4 |
| 16 | 14,000 | 5% Ruthenium on carbon | 200 | 5.5 | 2.5 | 1.0 |

TABLE I-continued

| Example No. | PVA, Avg. Molecular wt. | Catalyst | Temp. °C | Time, hr | Nitrogen Content Total | Basic |
|---|---|---|---|---|---|---|
| 17 | 14,000 | 5% Rhodium on alumina | 200 | 5.5 | — | 3.2 |

[a]Supported Nickel catalyst containing 68% by wt. Nickel
[b]56% by wt. Nickel on Kieselguhr
[c]60% by wt. Nickel on Kieselguhr
[d]No hydrogen added.

EXAMPLE 18

The reaction was carried out in a 1.4 l stainless steel bomb at 165° for 4 hrs with 90g of polyvinyl alcohol (avg. molecular weight 115,000), 120 g of water, 12 g of Ni-0104 catalyst (58% nickel on kieselgular, Harshaw), 103g of ammonia and 500 psig of hydrogen. The product was diluted with water and filtered to remove catalyst. Analysis of a freeze-dried product gave 1.0% total nitrogen, 0.8% basic nitrogen. The average molecular weight was 88,600.

EXAMPLE 19

A 45 ml stainless steel bomb was charged with 3g of polyvinyl alcohol (avg. molecular weight 14,000), 4 ml of water and 0.5 g of No. 28 Raney nickel (Raney Nickel Divison, W. R. Grace and Co.). A total of 6.3 g of mono methylamine was condensed in and the reaction was carried out at 200° for 5.5 hrs. The product was diluted with water, filtered to remove catalyst and the filtrate was freeze-dried to obtain solid product. Analysis gave C, 51.1%; H, 9.4%; N, 5.4%; basic nitrogen 2.3%.

EXAMPLE 20

The reaction of 3g of polyvinyl alcohol (avg. molecular weight 14,000), 4g of water, 0.5g of No. 28 Raney nickel and 9.14g of dimethylamine was carried out at 200° C for 5.5 hrs. as described above. The product was taken up in water and filtered to remove catalyst. The filtrate was heated under vacuum to remove water and the syrupy product was extracted with tetrahydrofuran to remove unreacted dimethyl amine. The residual solid was analyzed and found to contain C, 54.1%; H, 8.8%; N, 3.2%; basic nitrogen 2.5%.

EXAMPLE 21

A 45ml stainless steel autoclave was charged with 0.5g of dry Raney nickel (commercial Raney nickel, filered and washed with tetrahydrofuran) and 2g of styrene-allyl/alcohol copolymer, m.w. ~1700. The autoclave was closed and 2.25g (0.132 mole) of ammonia was condensed into the autoclave by cooling. The mixture was heated to 170° for 1.5 hrs., then to 250° for 5 hrs. with stirring. The autoclave and contents were cooled, the excess ammonia vented, and solid product dissolved in tetrahydrofuran. After filtration of the tetrahydrofuran solution, the tetrahydrofuran was evaporated to give an off-white solid, wt. 1.5g. The product had C, 84.01; H, 8.61; and N, 1.42%. Titration with perchloric acid in acetic acid indicated the presence of 0.62% nitrogen as basic nitrogen.

EXAMPLE 22

A 1000-ml stainless steel autoclave was charged with 60g of styrene-allylalcohol copolymer, m.w. 1700, and 10g of wet commercial Raney nickel. The autoclave was sealed and evacuated and then was charged with 45g of ammonia and 100 psig of hydrogen. The autoclave and contents were heated to 250° for 6.5 hrs. with agitation. During this time the pressure increased to 2400 psig. The mixture was cooled, the ammonia was vented off and the contents dissolved in tetrahydrofuran and filtered to remove catalyst. Evaporation of the solvent from the filtrate gave 53g of solid product. Elemental analysis indicated 1.82% total nitrogen; perchloroacetic acid titration showed 2.03% basic nitrogen.

A portion of the above product, 0.75g, was mixed with 1.25g of Epon 828 epoxy resin with heat and stirring to obtain a homogeneous mixture. The resulting syrup was degassed in vacuum and placed into a mold cavity, ¼ × 1/16 × 4 inches and cured at 100° and 4000 psi for 1.5 hr. The clear, hard amber specimen exhibited a strength of 17,820 psi and a flex modulus of 482,000 psi.

EXAMPLE 23

The reaction was carried out as described in Example 21, with 3g of styrene-allylalcohol copolymer, 2.25 g of ammonia and 100 psig of hydrogen and 0.5g of Ni-0104 catalyst (Harshaw, 58% nickel on kieselguhr). The catalyst was preactivated at 400° for 24 hrs in a stream of hydrogen. The reaction was effected at 175° for 5.5 hrs; the autogenous pressure was 1300 psig. The product, 2.6g, was worked-up as described in Example 1. Analysis indicated 1.10% total nitrogen (by combustion) and 1.22% basic nitrogen (by perchloric-acetic acid titration).

When the reaction was carried out exactly as described above except that a reaction temperature of 250° was used, the product contained 1.71% total nitrogen and 1.31% basic nitrogen.

EXAMPLE 24

The reaction between styrene-allylalcohol copolymer (S-AA) and ammonia was carried out for 5 hrs as described in Example 1. In each case 0.5g of dry, commercial active Raney nickel powder was used. The quantities of S-AA and ammonia used in each case, the reaction temperature and the product analysis is shown in Table 2:

TABLE 2

| Reaction Temp. | Wt. Reactants | | Nitrogen Content | |
|---|---|---|---|---|
| | S-AA, g | NH₃, g | Total,% | Basic, % |
| 230° | 4 | 2.59 | 1.08 | 0.50 |
| 250° | 3 | 2.25[a] | 1.44 | 0.72 |
| 250° | 3[b] | 2.25 | 1.53 | 0.67 |
| 250° | 3 | 2.25 | 1.48 | 0.64 |

[a]100 psig H₂ added
[b]only 2.5 g Raney nickel used

EXAMPLE 25

A 45 ml stainless steel autoclave was charged with 0.5g dry, commercial Raney nickel (filtered and washed with tetrahydrofuran and dried in nitrogen), 3g of styrene-allylalcohol (MW ~1700) and 6.1g of dimethylamine. The autoclave was sealed and heated to 200° for 5.5 hrs. The liquid product was taken up in tetrahydrofuran, filtered to remove catalyst and the tetrahydrofuran evaporated under reduced pressure to obtain 2.0g of solid. The product analyzed for: C, 79.84; H, 9.18; N, 1.62%. Perchloric - acetic acid titration indicated the presence of 1.16% basic nitrogen.

EXAMPLE 26

The reaction as described in Example 25, was repeated with 0.5g of dry Raney nickel powder, 3g of styrene-allylalcohol copolymers and 4.1g of methylamine. The reaction was carried out at 250° for 5.5 hrs. The gummy product, 2.8g, had the following elemental analysis: C, 83.57; H, 8.63; N, 2.91. Perchloric-acetic acid titration indicated 2.17% basic nitrogen.

EXAMPLE 27

Aqueous solutions of polyvinyl alcohol and ammoniated polyvinyl alcohol each containing 3% solids were prepared for emulsifying purposes. The ammoniated polyvinyl alcohol contained 0.84% basic nitrogen (wt.% on dry weight basis). Into 2 dram vials, was measured out 0.5 ml. of the above solutions with 0.5 ml. of $H_2O$, and 1 ml. of hexane was added. The vials were tightly capped, shaken vigorously and the time noted when the emulsion had separated sufficiently to leave 0.5 ml. of clear liquid on the bottom. (The upper layer was still emulsified).

TABLE 3

| Run No. | Emulsifying Agent | Time for ½ ml. to separate, sec. Trial No. | | | |
|---|---|---|---|---|---|
| | | #1 | #2 | #3 | Avg. |
| 1 | Polyvinyl Alcohol Gelvatol 1-90 | 90 | 90 | 97 | 92±3 |
| 2 | Ammoniated polyvinyl alcohol | 265 | 220 | 210 | 232±22 |
| 3 | Ammoniated polyvinyl alcohol | 30 | 40 | 40 | 37±4 |

The emulsification data of Table 3 clearly illustrate the superior results achieved with the product according to the invention (Run No. 2) versus polyvinyl alcohol (Run No. 1) and an acidified product (Run No. 3).

EXAMPLE 28

Ammoniated polyvinyl alcohols were evaluated as paper coatings by using 18.5 cm. Chatman #1 filter paper. Formulations were prepared and poured into shallow pan. The filter paper was dipped through the liquid, then hung up to dry in air and then placed in oven at 130° for 21 hr. The samples were allowed to cool 1.5 hr. to regain moisture to equilibrium level.

TABLE 4

| Sample No. | Formulation | Wt. of Sample Before Coating | After Coating & Drying | Wt. Gain | %Coating Added |
|---|---|---|---|---|---|
| 1 | 3% Ammoniated PV-OH + 0.165% epichlorohydrin | 2.4060 | 2.5533 | 0.1473 | 6.12 |
| 2 | 0.165% epichlorohydrin | 2.3575 | 2.5024 | 0.1449 | 6.15 |
| 3 | 1.5% Ammoniated PV-OH +0.083% epichlorohydrin | 2.3637 | 2.4016 | 0.0379 | 1.60 |
| 4 | | 2.3384 | 2.3794 | 0.0410 | 1.75 |
| 5 | 1.5% Ammoniated PV-OH + 0.165% epichlorohydrin | 2.3812 | 2.4188 | 0.0376 | 1.58 |
| 6 | | 2.3200 | 2.3488 | 0.0288 | 1.16 |
| 7 | 1.5% Ammoniated PV-OH | 2.3408 | 2.3679 | 0.0271 | 1.16 |
| 8 | 1.5% Ammoniated PV-OH | 2.3377 | 2.3664 | 0.0287 | 1.23 |
| 9 | 1.5% Gelvatrol 1-90** | 2.4103 | 2.4655 | 0.0552 | 2.29 |
| 10 | 1.5% Gelvatrol 1-90** | 2.3334 | 2.3857 | 0.0523 | 2.24 |
| 11 | 1.5% Gelvatrol 1-90 + 0.083% epichlorohydrin | 2.3067 | 2.3697 | 0.0630 | 2.73 |
| 12 | | 2.3367 | 2.3945 | 0.0558 | 2.39 |
| 13 | 1.5% Ammoniated PV-OH + 0.083% epichlorohydrin* | 2.3311 | 2.3740 | 0.0429 | 1.84 |
| 14 | | 2.4228 | 2.4644 | 0.0416 | 1.71 |
| 15 | Blank | 2.3682 | (23413) | (−0.0269) | (0) |
| 16 | Blank | 2.3519 | (2.3247) | (−0.0272) | (0) |
| | Avg. | 2.35665 | | | |

*Samples 13 & 14 were dried with heat gun immediately after coating, then placed in oven.
**Gelvatol 1-90 is a polyvinyl alcohol having an average molecule weight of 115,000.

EXAMPLE 29

Wet tensile strength studies of Example 28 material were made by single strip pulls in MD of 1.0 inch strips, 4.0 inch jar span, pull rate 0.5 inch/min. on Instron tensile tester. The 1 inch strips were cut from samples 3 through 18 of Example 28, cutting longitudinally in the machine direction. Two strips were cut from each circle. Strips were wetted and soaked 10 min. in 1.0% oz. hexadecylammonium bromide (detergent), rinsed and soaked 10 min. in distilled $H_2O$. Strips were removed, blotted and pulled.

TABLE 5

| Pair # | Wet Tensile, | #/in. Avg. | Tensile Corr. for dry wt. diff. a) between sheets | Tensile corr. % Coating | Avg. |
|---|---|---|---|---|---|
| 1 | 6.69, 6.37 | 6.53 | 6.40 | 1.05 | 1.08 |
| 2 | 6.20, 7.35 | 6.78 | 6.78 | 1.10 | |
| 3 | 4.36, 4.28 | 4.32 | 4.31 | 2.69 | 2.62 |
| 4 | 4.09, 4.78 | 4.44 | 4.47 | 2.55 | |
| 5 | 3.87, 4.12 | 4.00 | 3.96 | 2.51 | 2.59 |
| 6 | 3.32, 3.21 | 3.26 | 3.31 | 2.67 | |
| 7 | 4.00, 4.02 | 4.01 | 4.04 | 3.48 | 3.30 |
| 8 | 4.06, 3.53 | 3.80 | 3.83 | 3.11 | |
| 9 | 5.28, 4.89 | 5.08 | 4.97 | 2.17 | 2.07 |
| 10 | 4.15, 4.61 | 4.38 | 4.42 | 1.97 | |
| 11 | 4.68, 1.97 | 4.82 | 4.92 | 1.80 | 1.95 |
| 12 | 4.96, 5.02 | 4.99 | 5.03 | 2.10 | |
| 13 | 2.81, 2.75 | 2.78 | 2.81 | 1.53 | 1.58 |
| 14 | 2.66, 3.05 | 2.80 | 2.78 | 1.63 | |
| 15 | 0.45, 0.47 | 0.46 | | | |
| 16 | 0.47, 0.50 | 0.48 | | | | a) $\frac{Tensile}{Dry\ wt.}$ × Avg. Dry wt. (See Example 28)

| Recapitulation: | | Avg. Tensile, |
|---|---|---|
| Samples | Description | #/in-%coating |
| 1,2 | Ammon. PVOH+EPI 3% 0.165% | 1.08 |
| 3,4 | Ammon. PVOH+EPI 1.5% 0.083% | 2.62 |

-continued

| Recapitulation: | | Avg. Tensile, |
|---|---|---|
| Samples | Description | #/in-%coating |
| 5,6 | Ammon. PVOH+EPI | 2.59 |
| | 1.5% 0.165% | |
| 7,8 | Ammon. PVOH | 3.30 |
| | 1.5% | |
| 9,10 | Gelvatol 1-90* | 2.07 |
| | 1.5% | |
| 11,12 | Gelvatol 1-90 + EPI | 1.95 |
| | 1.5 0.083% | |
| 13,14 | Ammon. PVOH+EPI, immed. dry | 1.58 |
| | 1.5% 0.083% | |

*Gelvatol 1-90 is a polyvinyl alcohol having an average molecular weight of 115,000.

The above data illustrate the utility of the inventive compositions as wet strength coatings for paper.

What is claimed is:

1. A catalytic process for producing polymers having pendant amino and hydroxyl groups comprising the amination of polymers of ethylenically unsaturated alcohols selected from vinyl and allyl alcohols, and copolymers of said alcohols and vinyl compounds selected from the group consisting of vinyl esters of monocarboxylic acids and styrene, said process comprising contacting said polymers of ethylenically unsaturated alcohols or copolymers with at least one of ammonia, mono- and di- aliphatic amines in the presence of a Group VIII metal hydrogenation catalyst, at a temperature of from 125° C to 300° C and a pressure of from about 500 to 2500 psig, said unsaturated alcohol polymers and copolymers having a weight average molecular weight of from about 1700 to about 115,000.

2. The process according to claim 1 wherein the Group VIII metal catalyst is nickel.

3. The process according to claim 1 wherein the polymer of ethylenically unsaturated alcohol is polyvinyl alcohol.

4. The process according to claim 1 wherein the copolymer is a copolymer of vinyl alcohol and vinyl acetate.

5. The process according to claim 1 wherein the copolymer is a copolymer of allyl alcohol and styrene.

6. Amino substituted polymeric polyols of enhanced emulsifying capability having the general formula

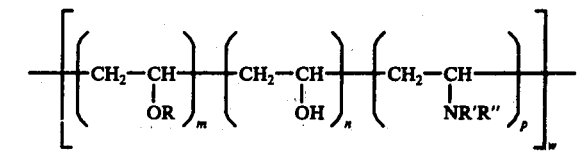

where
R is hydrogen or an acyl group:
R' and R" are hydrogen or an alkyl group,
n is an integer and
m, p and w are integers of 1 or more,
produced by the catalytic amination of polymers consisting of polyvinyl alcohol and copolymers of vinyl alcohol and vinyl acetate having a weight average molecular weight of from about 1700 to about 115,000 with at least one of ammonia, mono- and di-aliphatic amines in the presence of a Group VIII metal hydrogenation catalyst at a temperature of from 125° to 300° C and a pressure of from about 500 to 2500 psig.

7. The amino substituted polymeric polyols according to claim 6 wherein the acyl group has from 1 to about 20 carbon atoms per group and the alkyl group has from 1 to about 20 carbon atoms per group.

8. Amino substituted polyols having the general formula

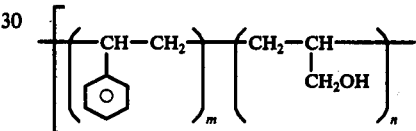

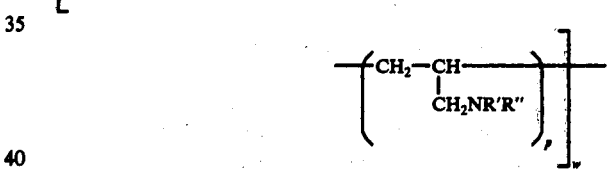

where R' and R" are hydrogen or an alkyl group and m, n, p and w are integers of 1 or more, produced by the catalytic amination of copolymers of styrene and allyl alcohol having a weight average molecular weight of from about 1700 to about 115,000 with at least one of ammonia, mono- and di- aliphatic amines in the presence of a Group VIII metal hydrogenation catalyst at a temperature of from 125° to 300° C and a pressure of from about 500 to 2500 psig.

9. The amino substituted polymeric polyols according to claim 8 wherein the alkyl group has from 1 to about 20 carbon atoms per group.

* * * * *